United States Patent [19]

Morency et al.

[11] Patent Number: 5,452,791
[45] Date of Patent: Sep. 26, 1995

[54] DUAL DRIVE FOR BELT CONVEYOR

[75] Inventors: Donald E. Morency; Lorne M. Wandzura, both of Saskatoon, Canada

[73] Assignee: Cominco Engineering Services Ltd., Vancouver, Canada

[21] Appl. No.: 276,631

[22] Filed: Jul. 18, 1994

[51] Int. Cl.$^6$ .................................................. B65G 23/04
[52] U.S. Cl. ................................... 198/835; 198/813
[58] Field of Search ................................ 198/813, 835

[56] References Cited

U.S. PATENT DOCUMENTS

| | | | |
|---|---|---|---|
| 1,499,319 | 6/1924 | Reid | 198/835 |
| 2,452,980 | 11/1948 | Beltz | 198/813 |
| 4,140,216 | 2/1979 | Conrad | 198/835 |
| 4,548,316 | 10/1985 | Maurer | 198/835 |
| 5,363,951 | 11/1994 | Mensch | 198/835 |

FOREIGN PATENT DOCUMENTS

| | | | |
|---|---|---|---|
| 1189451 | 3/1965 | Germany | 198/835 |
| 222857 | 5/1985 | Germany | 198/835 |

OTHER PUBLICATIONS

Article entitled "Dual Drive for Belt Conveyors" by S. Sur published in *The International Journal for Storing and Handling Bulk Materials*, vol. 7, No. 4, Aug. 1987.

*Primary Examiner*—Joseph E. Valenza
*Attorney, Agent, or Firm*—Elbie R. De Kock

[57] ABSTRACT

A tandem drive unit (24) on a flexible conveyor belt (12) comprises a primary drive pulley (20) and a secondary drive pulley (22) driven by a primary drive motor (26, 28) and a secondary drive motor (34) respectively. The primary drive motor (26, 28) has a predetermined full-load speed and the secondary drive motor (34) has a full-load speed which is not greater than a theoretical speed value for the secondary drive pulley (22) obtained by calculating the speed differential between the primary and secondary pulleys as a function of the horsepower applied to the first and secondary drive pulleys and the modulus of elasticity of the conveyor belt (12). Alternatively, a secondary drive motor with a predetermined full-load speed may be selected and the required full-load speed of the primary drive motor may be determined. A method of non-mechanically coupling a primary and a secondary drive pulley in a tandem conveyor drive of a conveyor belt is also provided.

13 Claims, 3 Drawing Sheets

DUAL DRIVE FOR BELT CONVEYOR

FIELD OF THE INVENTION

This invention relates to a dual drive for a belt conveyor and a method of implementing a dual drive.

BACKGROUND OF THE INVENTION

Belt conveyor drives utilizing a primary and a secondary drive drum or pulley to transmit horsepower into a stretchable fabric construction belt have operated for many years. The dual drive pulley arrangement or tandem drive is powered by electric motors which are coupled through reducers to each pulley shaft. The ability to effectively transmit the installed horsepower requires load sharing between the primary and secondary drives.

To achieve proper load sharing without direct coupling of the primary and secondary pulleys, such as with tie gears, has presented a problem and has in some instances resulted in overdesigning of the system to compensate for unequal power sharing. Tandem conveyor drives which have been manufactured without tie gears begin to overload the secondary drive modules once the conveyor load exceeds approximately 65% of the installed horsepower. Attempts have been made to accomplish load sharing by using different drum diameters and electric motor speed control methods but with limited success. In conventional systems, direct coupling the pulleys with timing gears appears to be the only positive method of achieving electric load sharing.

It is accordingly an object of the present invention to provide a non-mechanical method of load sharing so that both the primary and secondary drive motors load up evenly between the drive modules.

SUMMARY OF THE INVENTION

According to the invention, there is provided a method of non-mechanically coupling a primary drive pulley and a secondary drive pulley in a tandem conveyor drive of a conveyor belt, comprising the steps of selecting a primary drive motor for the primary drive pulley having a predetermined full-load motor speed; calculating the speed differential between the primary and secondary drive pulleys as a function of the horsepower applied to the first and secondary drive pulleys, and the modulus of elasticity of the conveyor belt to obtain a theoretical speed value for the secondary drive pulley; and selecting a secondary drive motor having a full-load motor speed which is not greater than said theoretical value or is approximately equal to said theoretical value.

Also according to the invention, there is provided a tandem drive unit on a flexible conveyor belt comprising a primary drive pulley and a secondary drive pulley driven by a primary drive motor and a secondary drive motor, respectively, wherein the primary drive motor has a predetermined full-load speed and the secondary drive motor has a full-load speed which is not greater than a theoretical speed value for the secondary drive pulley obtained by calculating the speed differential between the primary and secondary pulleys as a function of the horsepower applied to the first and secondary drive pulleys and the modulus of elasticity of the conveyor belt.

Further according to the invention, there is provided a tandem drive unit on a flexible conveyor belt comprising a primary drive pulley and a secondary drive pulley driven by a primary drive motor and a secondary drive motor, respectively, wherein the primary drive motor has a predetermined full-load speed and the secondary drive motor has a full-load speed which is approximately equal to a theoretical speed value for the secondary drive pulley obtained by calculating the speed differential between the primary and secondary pulleys as a function of the horsepower applied to the first and secondary drive pulleys and the modulus of elasticity of the conveyor belt.

Also according to the invention, there is provided a method of constructing a tandem drive unit for a flexible conveyor belt having primary and secondary drive pulleys, comprising the steps of selecting a primary drive motor having a predetermined full-load speed for driving the primary drive pulley, calculating a theoretical speed value for the secondary drive pulley as a function of the horsepower applied to the first and second drive pulleys and the modulus of elasticity of the conveyor belt and selecting a secondary drive motor for driving the secondary drive pulley having a full-load speed which is not greater than said theoretical value or is approximately equal to said theoretical value.

Further according to the invention, there is provided a method of non-mechanically coupling a primary drive pulley and a secondary drive pulley in a tandem conveyor drive of a conveyor belt, comprising the steps of selecting a secondary drive motor for the secondary drive pulley having a predetermined full-load motor speed; calculating the speed differential between the primary and secondary drive pulleys as a function of the horsepower applied to the first and secondary drive pulleys, and the modulus of elasticity of the conveyor belt to obtain a theoretical speed value for the primary drive pulley; and selecting a primary drive motor having a full-load motor speed which is not less than said theoretical speed value or is approximately equal to said theoretical value.

Also according to the invention, there is provided a tandem drive unit on a flexible conveyor belt comprising a primary drive pulley and a secondary drive pulley driven by a primary drive motor and a secondary drive motor, respectively, wherein the secondary drive motor has a predetermined full-load speed and the primary drive motor has a full-load speed which is not less than a theoretical speed value for the primary drive pulley obtained by calculating the speed differential between the primary and secondary pulleys as a function of the horsepower applied to the first and secondary drive pulleys and the modulus of elasticity of the conveyor belt.

Further according to the invention, there is provided a tandem drive unit on a flexible conveyor belt comprising a primary drive pulley and a secondary drive pulley driven by a primary drive motor and a secondary drive motor, respectively, wherein the secondary drive motor has a predetermined full-load speed and the primary drive motor has a full-load speed which is approximately equal to a theoretical speed value for the primary drive pulley obtained by calculating the speed differential between the primary and secondary pulleys as a function of the horsepower applied to the first and secondary drive pulleys and the modulus of elasticity of the conveyor belt.

Also according to the invention, there is provided a method of constructing a tandem drive unit for a flexible conveyor belt having primary and secondary drive pulleys, comprising the steps of selecting a secondary drive motor having a predetermined full-load speed for driving the secondary drive pulley, calculating a theoretical speed value for the primary drive pulley as a function of the horsepower applied to the first and second drive pulleys and the modulus of elasticity of the conveyor belt and selecting a primary drive motor for driving the primary drive pulley having a full-load speed which is not less than said theoretical speed value or is approximately equal to said theoretical value.

Further objects and advantages of the invention will become apparent from the description of a preferred embodiment of the invention below.

BRIEF DESCRIPTION OF THE DRAWINGS

The invention will now be described, by way of an example, with reference to the accompanying drawings, in which.

DETAILED DESCRIPTION OF PREFERRED EMBODIMENT

The invention can be utilized on any belt drive application where power must be transmitted into a stretchable or elastic conveyor belt. The most appropriate use is with fabric belts which are used to convey materials over long distances.

Figure 1:
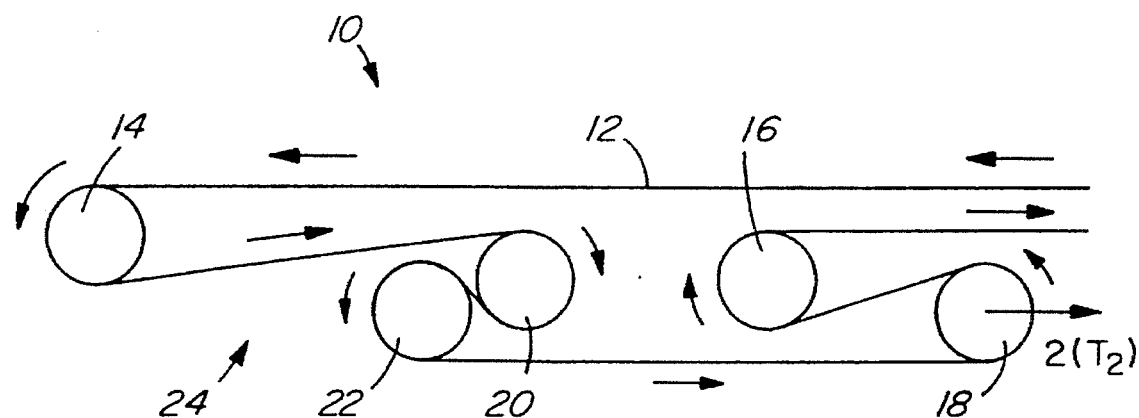
FIG. 1 is a schematical side view of a tandem drive arrangement in a conveyor belt system.

In FIG. 1, reference numeral 10 general indicates a belt conveyor system comprising a continuous or endless conveyor belt 12 which is supported by pulleys 14, 16 and 18, the pulley at the other extreme end of the conveyor system 10 not being shown. The belt 12 in the present example is a 54 inch wide fabric belt with a modulus of elasticity of 0.306% per 100 lbs/inch width, forming part of an underground conveyor in a mine to convey ore, such as potash ore, over a large distance, such as 10,000 feet.

The belt 12 is driven by applying tension to the belt 12 by weaving it through a series of driven pulleys 20, 22, hereafter referred to as the tandem drive unit and generally indicated by reference numeral 24. The pulleys 16, 18 serve to receive the belt 12 after leaving the drive unit 24 and is referred to as the "take up".

Figure 3:
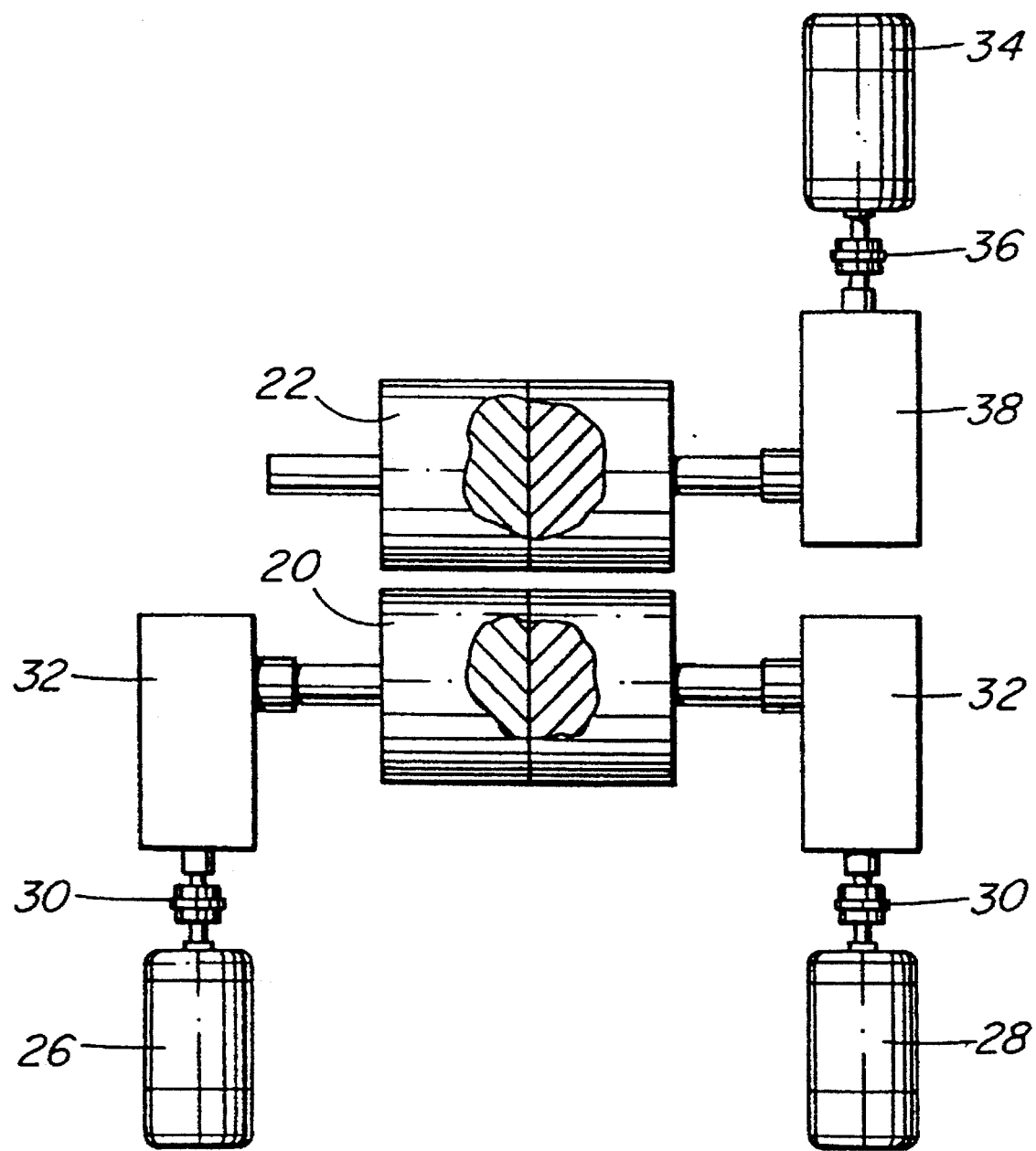
FIG. 3 is a plan view of the tandem drive of FIG. 2 with the conveyor belt omitted.

In the present example, pulleys 20 and 22 have diameters of 43 inches. Pulley 20, which is the primary drive pulley, is connected to a pair of 250 horsepower electric motors 26 and 28 through high-speed couplings 30 and gear reducers 32. (See FIG. 3.)

Pulley 22, which is the secondary drive pulley, is connected to a 250 horsepower motor 34 through a speed coupling 36 and gear reducer 38. The gear reducers 32, 38 produce a gear reduction of 34.2.

Thus, the tandem drive 24 is a 750 horsepower drive comprising three drive modules of 250 horsepower each, with two modules installed on the primary pulley 20 and one module on the secondary pulley 22. The primary and secondary drive pulleys 20, 22 are not externally coupled by mechanical means, such as tie gears.

In conveyors of this type with elastic conveyor belts, the belt stretches according to the tension applied thereto, the amount of stretch being directly proportional to the input horsepower and the modulus of elasticity of the conveyor belt. Therefore, the speed of the belt entering a drive pulley is greater than the speed of the belt leaving the pulley.

Figure 4:
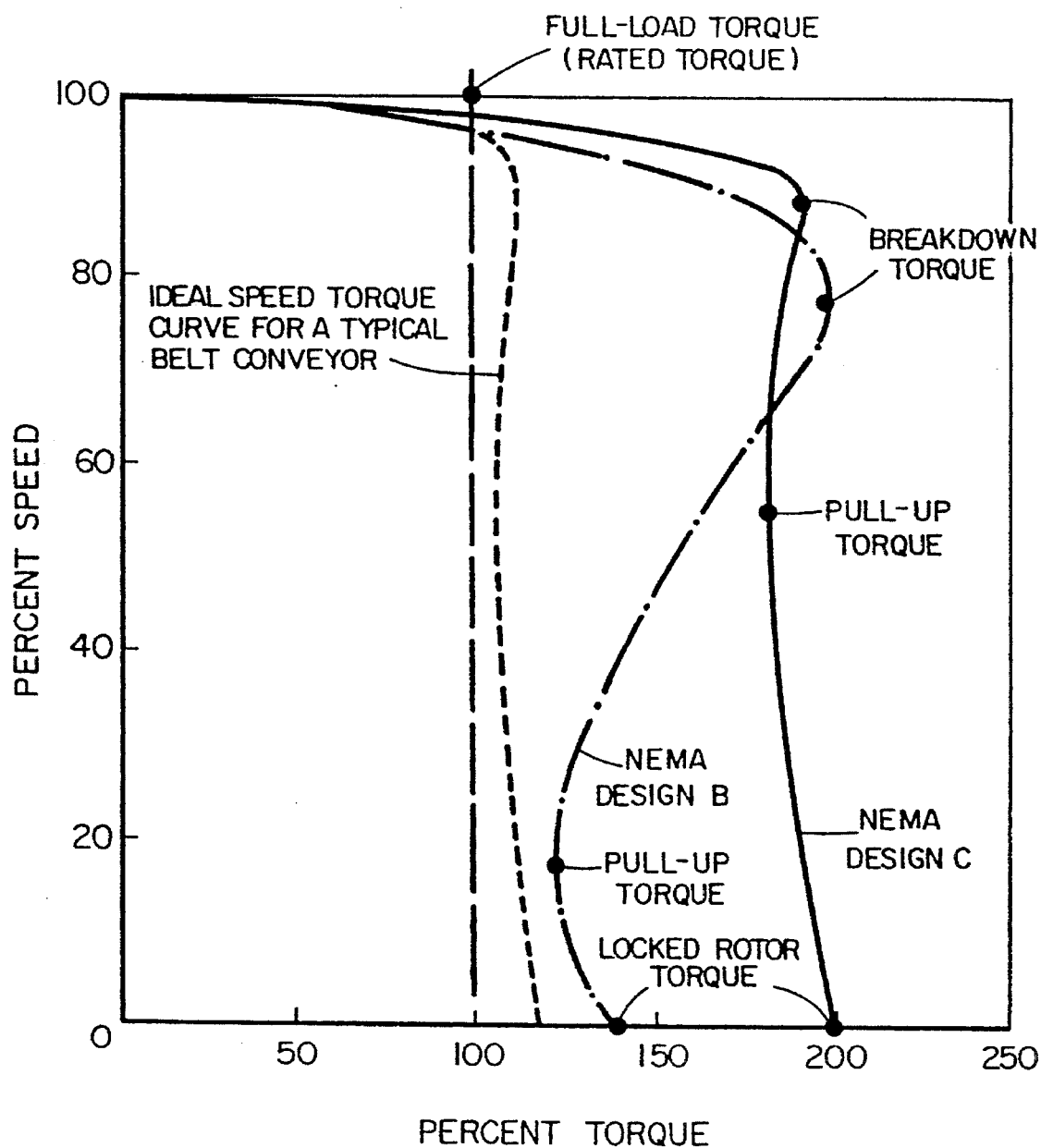
FIG. 4 shows typical torque versus speed curves for NEMA type B and C squirrel cage motors.

The operating speed of an alternating current induction motor is approximately linearly proportional to the speed between no-load and full-load torque. FIG. 4 illustrates typical torque versus speed curves for NEMA B and C squirrel cage motors. This illustration is from the Conveyor Manufacturers Association handbook entitled "Belt Conveyors for Bulk Materials", Third Edition.

In the present example, the motors 26, 28 are two standard 250-horsepower NEMA B motors, with full-load motor speeds of 1780 rpm, which are installed on the primary drive pulley 20. If the total input horsepower is taken as being equal to 450, the torque T at the primary pulley 20 is calculated as follows:

$$T = \frac{450 \times 5250}{(1780/34.2)} \text{ ft. lbs} = 45,392 \text{ ft. lbs}$$

Therefore, belt tension t=

$$t = \frac{45,392}{43/(2 \times 12)} = 25,335 \text{ lbs.}$$

Expressed in terms of lbs/inch width:

$$t = \frac{25,335}{54} = 470 \text{ lbs/inch width}$$

Therefore, the belt length differential=

$$\frac{470}{100} \times 0.306 = 1.4\%$$

The belt length differential for the secondary pulley 22 is calculated in a similar fashion, assuming that when the primary drive motors are inputting 450 horsepower, the secondary drive motor should be contributing about 200 horsepower.

Therefore, the torque at the secondary pulley 22:

$$T = \frac{200 \times 5250}{(1780/34.2)} = 20,174 \text{ ft. lbs}$$

Therefore, belt tension t=

$$t = \frac{20,174}{43(12 \times 2)} = 11,260 \text{ lbs.}$$

Expressed in terms of lbs./inch width:

$$t = \frac{11,260}{54} = 208 \text{ lbs/inch width}$$

Therefore, the belt length differential=

$$\frac{208}{100} \times .306 = 0.63\%$$

Figure 2:
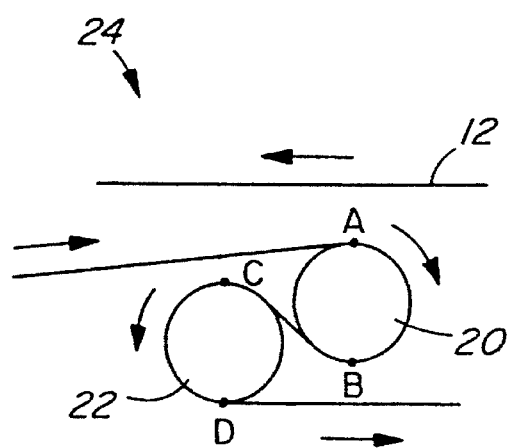
FIG. 2 is a partial view showing the tandem drive arrangement of FIG. 1.

With reference to FIG. 2, the belt speed at the points A, B, C and D is represented by the symbols $V_A$, $V_B$, $V_C$ and $V_D$, respectively. Since the speed of the belt 12 entering a drive pulley is greater than the speed of the belt 12 leaving it, it follows that $V_A > V_B$ and $V_C > V_D$, whereas $V_B = V_C$, which is the speed of the belt between the pulleys 20, 22. The relationship between $V_A$ and $V_B$ and the relationship between $V_C$ and $V_D$ is given by the following two equations, respectively:

$$V_B = (1 - 0.014)V_A \quad (1)$$

$$V_D = (1 - 0.0063)V_C \quad (2)$$

where 0.014 and 0.0063 are the belt length differentials calculated above. The equations (1) and (2) do not take into account the speed reduction of the motors resulting from the application of load. Neglecting the reducer ratio for simplicity, it is assumed that $V_B$ is the full-load motor speed for the NEMA B motor, which is 1780 rpm for an 1800 rpm motor. Then $V_D$ must be the full-load motor speed of the secondary drive motor.

From (1) and (2) above:

$$V_D = 0.9937 \, V_B = 1768 \text{ rpm}.$$

Thus, if a NEMA B motor were to be used on the secondary drive pulley 22, it would be overloading before the motor speed reached 1768 rpm, since its full-load speed is 1780 rpm.

To achieve load sharing, the secondary drive motor must have a full-load speed of 1765 rpm, which corresponds with the full-load speed of a NEMA C motor. Thus, the latter motor would be suitable for use as secondary drive in the present application.

If the belt modulus was to increase beyond 0.306% per 100 lbs/inch width, the secondary motor speed would be slower and require a different full-load speed. The rotor design would then be altered to suit this particular case, according to the principles of the invention.

To effectively apply the principles of the invention in a particular application, the conveyor drive configuration, conveyor belt modulus of elasticity and torque speed characteristics of the primary drive electrical motor or motors are taken into account in order to calculate the speed differential between the primary and secondary drives. This information is then used to specify the speed torque curve of the secondary drive motor or motors.

Motor torque speed characteristics are a function of rotor design. Thus, rotors can be designed to desired requirements of a particular application. However, motors with standard or custom torque speed characteristics can be used, as in the example above. In each case the torque characteristics of the primary and secondary motors are selected to match the elasticity modulus of the conveyor belt.

Whereas, in the above example the method was carried out by selecting the primary motors and determining the characteristics, the opposite procedure can by followed by selecting the secondary motor and then determining the required characteristics of the primary motor or motors.

The invention is not limited to tandem drive arrangements and may be used for three- and four-pulley drive arrangements as well.

While only a preferred embodiment of the invention has been described herein in detail, the invention is not limited thereby and modifications can be made within the scope of the attached claims.

What is claimed is:

1. A method of non-mechanically coupling a primary drive pulley and a secondary drive pulley in a tandem conveyor drive of a conveyor belt, comprising the steps of:

selecting a primary drive motor for the primary drive pulley having a predetermined full-load motor speed;

calculating the speed differential between the primary and secondary drive pulleys as a function of the horsepower applied to the first and secondary drive pulleys, and the modulus of elasticity of the conveyor belt to obtain a theoretical speed value for the secondary drive pulley; and selecting a secondary drive motor having a full-load motor speed which is not greater than said theoretical speed value.

2. A method of non-mechanically coupling a primary drive pulley and a secondary drive pulley in a tandem conveyor drive of a conveyor belt, comprising the steps of:

selecting a primary drive motor for the primary drive pulley having a predetermined full-load motor speed;

calculating the speed differential between the primary and secondary drive pulleys as a function of the horsepower applied to the first and secondary drive pulleys, and the modulus of elasticity of the conveyor belt to obtain a theoretical speed value for the secondary drive pulley; and selecting a secondary drive motor having a full-load motor speed which is approximately equal to said theoretical value.

3. A tandem drive unit on a flexible conveyor belt comprising a primary drive pulley and a secondary drive pulley driven by a primary drive motor and a secondary drive motor, respectively, wherein the primary drive motor has a predetermined full-load speed and the secondary drive motor has a full-load speed which is not greater than a theoretical speed value for the secondary drive pulley obtained by calculating the speed differential between the primary and secondary pulleys as a function of the horsepower applied to the first and secondary drive pulleys and the modulus of elasticity of the conveyor belt.

4. The tandem drive unit according to claim 3, wherein the conveyor belt has a modulus of elasticity of about 0.3 and 450 and 200 horsepower is applied to the primary and secondary drive pulleys, respectively, and wherein the primary drive motor has a full-load speed of approximately 1780 rpm and the secondary drive pulley has a full-load speed of approximately 1765 rpm.

5. A tandem drive unit on a flexible conveyor belt comprising a primary drive pulley and a secondary drive pulley driven by a primary drive motor and a secondary drive motor, respectively, wherein the primary drive motor has a predetermined full-load speed and the secondary drive motor has a full-load speed which is approximately equal to a theoretical speed value for the secondary drive pulley obtained by calculating the speed differential between the primary and secondary pulleys as a function of the horsepower applied to the first and secondary drive pulleys and the modulus of elasticity of the conveyor belt.

6. A method of constructing a tandem drive unit for a flexible conveyor belt having primary and secondary drive pulleys, comprising the steps of selecting a primary drive motor having a predetermined full-load speed for driving the primary drive pulley, calculating a theoretical speed value for the secondary drive pulley as a function of the horsepower applied to the first and second drive pulleys and the modulus of elasticity of the conveyor belt and selecting a secondary drive motor for driving the secondary drive pulley having a full-load speed which is not greater than said theoretical speed value.

7. A method of constructing a tandem drive unit for a flexible conveyor belt having primary and secondary drive pulleys, comprising the steps of selecting a primary drive motor having a predetermined full-load speed for driving the primary drive pulley, calculating a theoretical speed value for the secondary drive pulley as a function of the horsepower applied to the first and second drive pulleys and the modulus of elasticity of the conveyor belt and selecting a secondary drive motor for driving the secondary drive pulley having a full-load speed which is approximately equal to said theoretical value.

8. A method of non-mechanically coupling a primary drive pulley and a secondary drive pulley in a tandem conveyor drive of a conveyor belt, comprising the steps of:

selecting a secondary drive motor for the secondary drive pulley having a predetermined full-load motor speed;

calculating the speed differential between the primary and secondary drive pulleys as a function of the horsepower applied to the first and second drive pulleys, and the modulus of elasticity of the conveyor belt to obtain a theoretical speed value for the primary drive pulley; and selecting a primary drive motor having a full-load motor speed which is not less than said theoretical speed value.

9. A method of non-mechanically coupling a primary drive pulley and a secondary drive pulley in a tandem conveyor drive of a conveyor belt, comprising the steps of:

selecting a secondary drive motor for the secondary drive pulley having a predetermined full-load motor speed;

calculating the speed differential between the primary and secondary drive pulleys as a function of the horsepower applied to the first and second drive pulleys, and the modulus of elasticity of the conveyor belt to obtain a theoretical speed value for the primary drive pulley; and selecting a primary drive motor having a full-load motor speed which is approximately equal to said theoretical value.

10. A tandem drive unit on a flexible conveyor belt comprising a primary drive pulley and a secondary drive pulley driven by a primary drive motor and a secondary drive motor, respectively, wherein the secondary drive motor has a predetermined full-load speed and the primary drive motor has a full-load speed which is not less than a theoretical speed value for the primary drive pulley obtained by calculating the speed differential between the primary and secondary pulleys as a function of the horsepower applied to the first and secondary drive pulleys and the modulus of elasticity of the conveyor belt.

11. A tandem drive unit on a flexible conveyor belt comprising a primary drive pulley and a secondary drive pulley driven by a primary drive motor and a secondary drive motor, respectively, wherein the secondary drive motor has a predetermined full-load speed and the primary drive motor has a full-load speed which is approximately equal to a theoretical speed value for the primary drive pulley obtained by calculating the speed differential between the primary and secondary pulleys as a function of the horsepower applied to the first and secondary drive pulleys and the modulus of elasticity of the conveyor belt.

12. A method of constructing a tandem drive unit for a flexible conveyor belt having primary and secondary drive pulleys, comprising the steps of selecting a secondary drive motor having a predetermined full-load speed for driving the secondary drive pulley, calculating a theoretical speed value for the primary drive pulley as a function of the horsepower applied to the first and second drive pulleys and the modulus of elasticity of the conveyor belt and selecting a primary drive motor for driving the primary drive pulley having a full-load speed which is not less than said theoretical speed value.

13. A method of constructing a tandem drive unit for a flexible conveyor belt having primary and secondary drive pulleys, comprising the steps of selecting a secondary drive motor having a predetermined full-load speed for driving the secondary drive pulley, calculating a theoretical speed value for the primary drive pulley as a function of the horsepower applied to the first and second drive pulleys and the modulus of elasticity of the conveyor belt and selecting a primary drive motor for driving the primary drive pulley having a full-load speed which is approximately equal to said theoretical value.

* * * * *